Patented Dec. 27, 1938

2,141,707

UNITED STATES PATENT OFFICE 2,141,707

VAT DYESTUFFS OF THE TRIAZOLOAN-THRAQUINONE SERIES

Friedrich Ebel, Mannheim, Germany, assignor to General Aniline Works, Inc., New York, N. Y., a corporation of Delaware No Drawing. Application November 19, 1936, Serial No. 111,612. In Germany November 27, 1935

19 Claims. (Cl. 260—303)

The present invention relates to new vat dyestuffs of the triazoloanthraquinone series.

I have found that compounds of the anthraquinone series having the general constitution:—

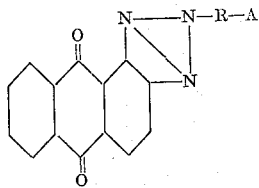

wherein R stands for a cyclic radical having up to two nonhydrogenated rings and A for a radical capable of being vatted, and in which any desired atoms or atomic groups may be present in the anthraquinone nucleus shown are valuable vat dyestuffs.

For the prepartion of these compounds, the diazo compound of an amine A—R—NH₂ is coupled with a 2-aminoanthracene and the ortho-aminoazo compound thus obtained is oxidized. Since the oxidation proceeds in two stages, it may also be carried out in separate operations. The ortho-aminoazo compound may also first be oxidized to triazoloanthracene and the latter then oxidized as such to the triazoloanthraquinone.

In order to prepare compounds of the said kind in which A is also the radicle of a triazolonthraquinone, the procedure may also be that 1 molecular proportion of a tetrazonium salt is coupled with 2 molecular proportions of a 2-aminoanthracene, the resulting diazo compound being oxidized.

The dyestuffs may also be obtained by exchanging the radical X in a triazoloanthracene of the constitution:—

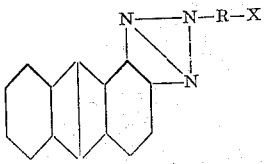

(in which X is a radical capable of being exchanged for the radical of a compound capable of being vatted), or in the corresponding triazoloanthraquinone, by the radical of a compound capable of being vatted and, when an anthracene has been used, subsequently oxidizing it to the anthraquinone. As radicals capable of being vatted there may be mentioned for example radicals of anthraquinones, anthrapyrimidines, anthrapyridines, pyrazolanthrones, dibenzanthrones, azabenzanthrones, phthaloylcarbazoles, anthraquinonethioxanthones, dibenzpyrenequinones and phthaloylacridones.

The vat dyestuffs thus obtainable are almost all distinguished by very good properties as regards fastness. The unsymmetrically constituted dyestuffs usually have often the advantage in comparison with the symmetrically constituted dyestuffs of better solubility in the vat and greater yield.

The following examples will further illustrate how my said invention may be carried out in practice but the invention is not restricted to these examples. The parts are by weight.

Example 1

18.5 parts of 4.4′-diaminodiphenyl are tetrazotized in the usual manner and the tetrazo solution is poured at ordinary temperature into a mixture of 42 parts of 2-aminoanthracene, 440 parts of pyridine and 880 parts of water. The deep dark violet compound obtained forms, after crystallization from nitrobenzene, fine black-green needles having a violet tinge which melt at 311° C.

A mixture of 10 parts of the said compound, 300 parts of nitrobenzene and 100 parts of glacial acetic acid is heated at 120° C. and 10 parts of chromium trioxide are added gradually. After half an hour, the violet compound has been converted into a yellow one. The mixture is allowed to cool, the yellow compound is filtered off by suction and washed consecutively with alcohol, dilute sulphuric acid and water. A reddish yellow-brown crystal powder is thus obtained which melts at above 360° C. From analysis and the manner of its preparation, the following constitution may be derived for the compound:—

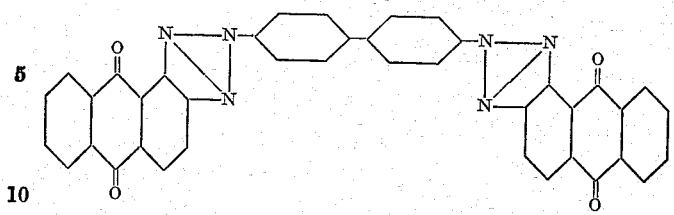

It dissolves in concentrated sulphuric acid giving a brown coloration; its vat is violet. It dyes vegetable fibres yellow shades from a hot vat.

Example 2

48.2 parts of 4.4'-diaminodiphenylurea are tetrazotized and the tetrazo compound is coupled with a solution of 80 parts of 2-aminoanthracene in 800 parts of pyridine and 1600 parts of water. After 6 hours, the red powder formed is filtered off by suction, washed and dried. It melts at 277° C. after crystallization from nitrobenzene.

By oxidation with chromic acid in a mixture of nitrobenzene and glacial acetic acid in the manner described in Example 1, there is obtained therefrom the triazole in the form of a brown powder. It is constituted as follows:—

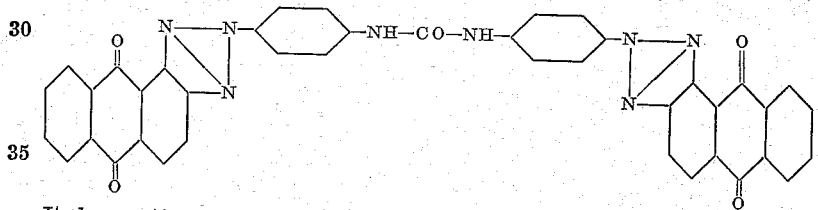

It dyes cotton reddish yellow-brown shades.

In a similar manner there may be obtained from 2-aminoanthraquinone and 4.4'-diaminodiphenylketone, by way of the corresponding aminoazo compound which is a brown-black crystal powder melting at 270° C., the pale brown triazole having the constitution:—

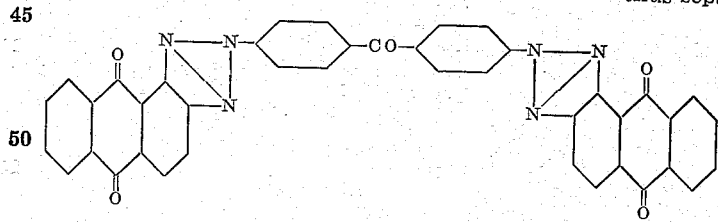

by oxidation with chromium trioxide. This dyes cotton brown shades from a black-green vat.

Example 3

The diazo compound of 13.8 parts of 1-amino-4-nitrobenzene is coupled with 19.5 parts of 2-aminoanthracene. The 1-(4'-nitrophenyl)-azo-2-aminoanthracene thus obtained is a dark violet crystalline powder which melts at 240° C. By oxidation with chromium trioxide it is converted into the pale brown colored 4'-nitrophenyltriazoloanthraquinone which melts at 325° C.

The oxidation may also be carried out in stages by first treating the said azo compound with hypochlorite or with copper powder in boiling nitrobenzene whereby it is converted into the yellow 4-nitrophenyltriazoloanthracene which melts at from 295° to 296° C. and then oxidizing the latter with a solution of bichromate in sulphuric acid to form the 4'-nitrophenyltriazoloanthraquinone.

The 4'-nitrophenyltriazoloanthraquinone thus obtained may be converted for example by boiling with aqueous sodium sulphide solution into the corresponding aminophenyltriazoloanthraquinone having the constitution:—

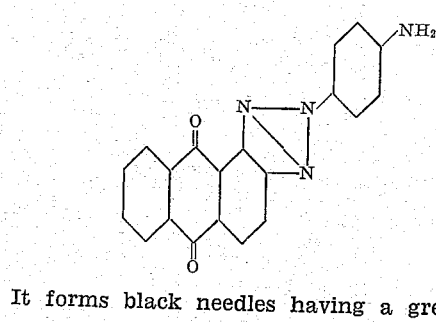

It forms black needles having a green superficial lustre and melts at 356° C.

A mixture of 34 parts of this amine, 30 parts of anthraquinone-2-carboxylic acid chloride and 1000 parts of 1.2-dichlorbenzene is heated to boiling for about an hour. The acylamine thus separated in the form of khaki-yellow crystals. It dyes cotton clear pale yellow shades of great depth of color from a violet vat.

The same compound is obtained by diazotizing mono-(2'-anthraquinonylcarbonylo)-4'-phenylenediamine:—

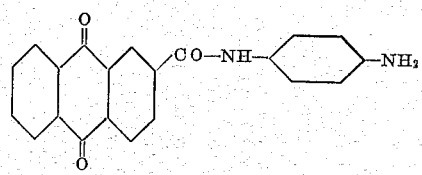

(obtainable from anthraquinone-2-carboxylic acid chloride with 1-amino-4-nitrobenzene), coupling the diazo compound with 2-aminoanthracene and treating the azo compound with chromium trioxide.

If the aminophenyltriazoloanthraquinone be heated to boiling for an hour with 1-aminoanthraquinone-2-carboxylic acid chloride in 1.2- dichlorbenzene, the dyestuff

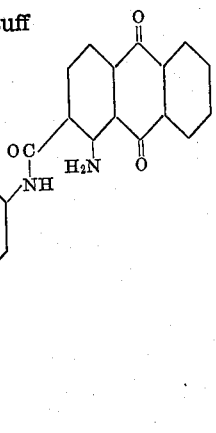

crystallizes in the form of brown-red needles.

It dyes cotton very powerful brick-red shades from a warm violet vat.

Example 4

A mixture of 34 parts of the aminophenyltriazoloanthraquinone described in paragraph 3 of Example 3 and 42.6 parts of 5.6-phthaloylacridone-2-carboxylic acid chloride is heated in the presence of 340 parts of nitrobenzene at from 155° to 160° C. for an hour while stirring. The mass thickens and red-brown crystals of the compound:— gradually separate out. It dyes beautiful, powerful yellow-red shades from a hot violet vat.

Instead of 5.6-phthaloylacridone-2-carboxylic acid chloride, its dichloro derivatives may be used in which case a dyestuff is obtained which yields somewhat more yellowish dyeings. Similar reddish yellow dyestuffs can be obtained with 3.4-phthaloylacridone-5-carboxylic acid chloride and 3.4-chlorphthaloylacridone-5-carboxylic acid chloride.

Example 5

A mixture of 17 parts of aminophenyltriazoloanthraquinone, 500 parts of 1.2-dichlorbenzene, 15 parts of pyridine and 3.2 parts of oxalyl chloride is heated at from 130° to 140° C. for half an hour while stirring. By cooling, the dyestuff:—

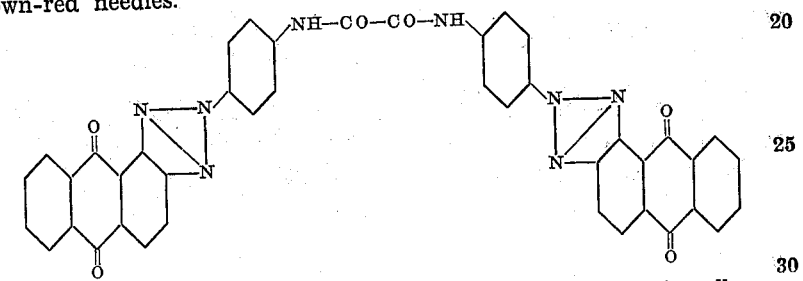

crystallizes out. It dyes cotton reddish yellow shades.

If 6 parts of isophthaloyl chloride be used instead of oxalyl chloride, a yellow dyestuff is obtained having the constitution:—

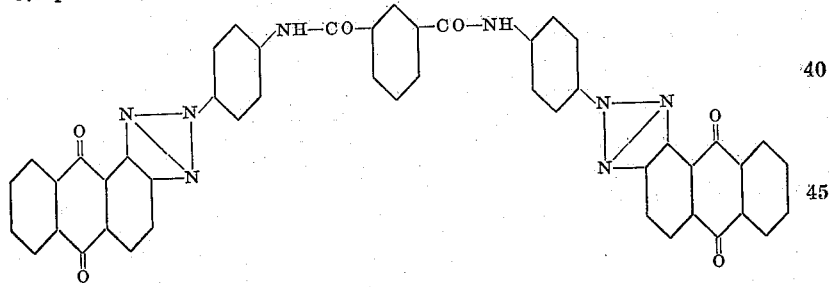

Example 6

A mixture of 17 parts of aminophenyltriazoloanthraquinone, 35 parts of cyanuric chloride and 75 parts of nitrobenzene is heated at 120° C. for

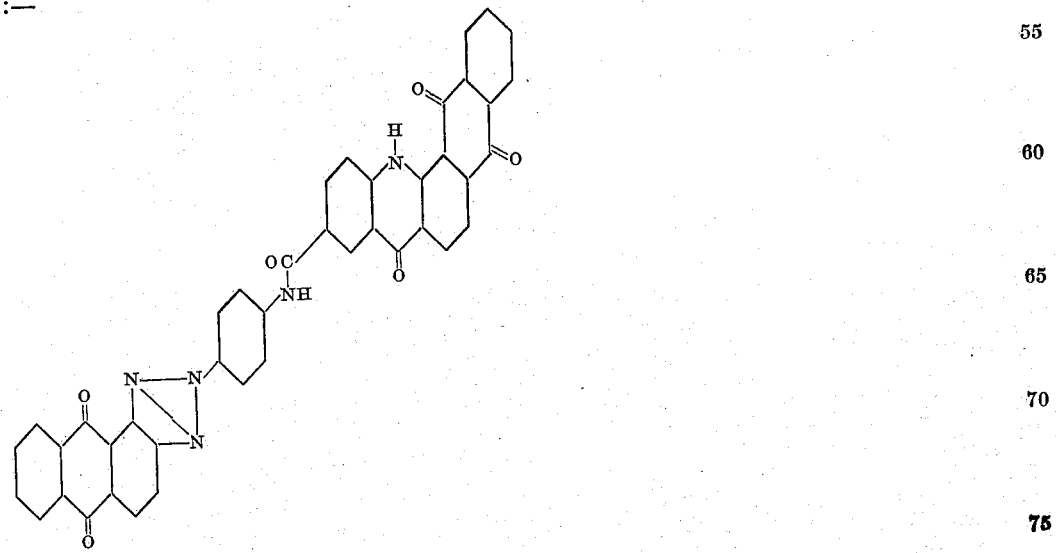

4 hours. The dyestuff having the constitution:—

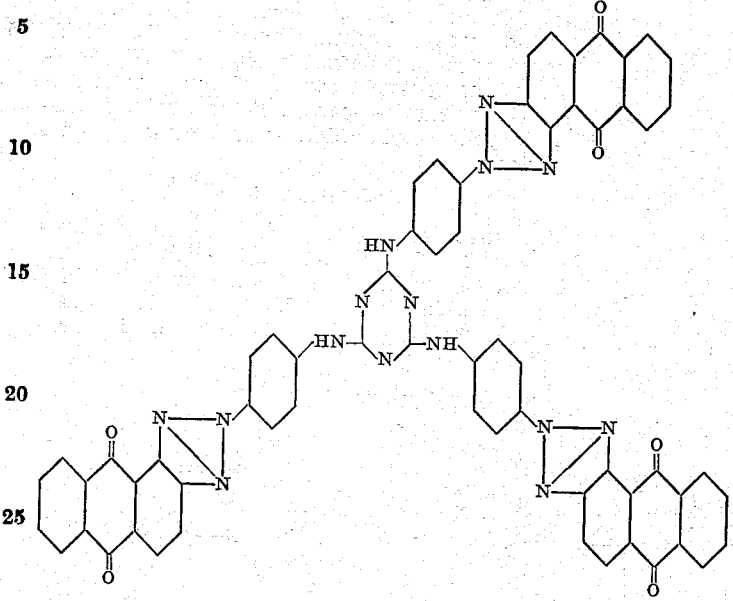

thus obtained, which forms yellow-red crystals, is filtered off by suction while hot. It dyes cotton clear golden-orange shades from a hot red-violet vat.

Example 7

A mixture of 24 parts of 1-chloranthraquinone, 34 parts of aminophenyltriazoloanthraquinone, 11 parts of anhydrous potassium acetate, 0.2 part of copper acetate and 1000 parts of naphthalene is heated to boiling for 20 hours. The compound thus formed is filtered off by suction while hot and washed consecutively with benzene, alcohol and water. The dyestuff of the constitution:—

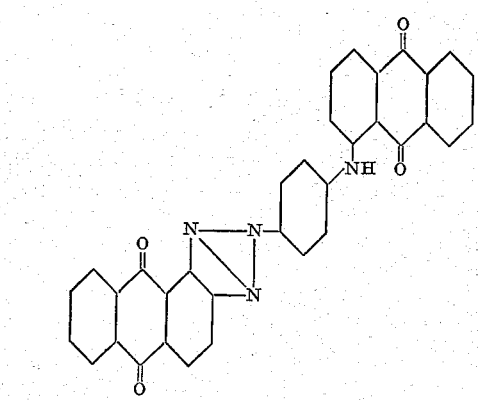

obtained as a brown black powder dyes cotton Bordeaux shades from a red vat.

By treatment with hot concentrated sulphuric acid it is converted into a dyestuff which yields yellow dyeings on cotton. Instead of concentrated sulphuric acid, a mixture of anhydrous aluminium chloride and sodium chloride may be used for this treatment, the reaction temperature being 140° C.

Example 8

The diazo compound of 27.6 parts of 1-amino-3-nitrobenzene is coupled in the presence of water and pyridine with 44 parts of 2-aminoanthracene. The red powder which melts at from 250° to 251° C. thus obtained may be converted, by treatment with the calculated amount of chromium trioxide in the presence of nitrobenzene and glacial acetic acid, into the 3'-nitrophenyltriazoloanthraquinone which forms pale brown crystals having a melting point of 304° C. By boiling with aqueous sodium sulphide solution it is converted into the brown crystalline 3'-aminophenyltriazoloanthraquinone:—

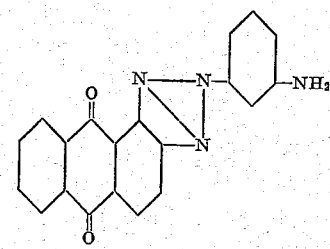

which melts at 229° C.

Yellow to brown colored vat dyestuffs can be prepared from this amine for example by working in the manner described in Example 3 to 7 with carboxylic acid chlorides of compounds capable of being vatted such as the chlorides of anthraquinone-2-carboxylic acid, 1.9-thiazoloanthrone-2-carboxylic acid, 1.9-pyrazole-anthrone carboxylic acid, 3.4-phthaloylacridone-7-carboxylic acid or 1.2-phthaloylthioxanthrone-5-carboxylic acid.

Example 9

A mixture of 31 parts of 1-cyano-2-bromanthraquinone, 34 parts of aminophenyltriazoloanthraquinone, 9 parts of anhydrous potassium acetate, 0.1 part of copper acetate and 750 parts of nitrobenzene is heated to boiling for an hour.

The brown compound having the constitution:—

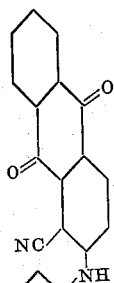

thus formed dyes cotton brown shades from a red vat.

By treatment with hot concentrated sulphuric acid it is converted into a dyestuff which yields yellow dyeings on cotton.

Example 10

The diazo compound of 13.7 parts of 4-aminobenzene-1-carboxylic acid is coupled in aqueous pyridine with 21 parts of 2-aminoanthracene. The resulting aminoazo carboxylic acid forms brown lustrous crystals from trichlorbenzene and these melt at from 280° to 283° C.

By treatment with chromium trioxide in the presence of nitrobenzene and glacial acetic acid at 120° C., there is obtained therefrom the yellow phenyltriazoloanthraquinone-4'-carboxylic acid which melts at above 360° C. If this acid be boiled for about half an hour with phosphorus pentachloride in 1.2-dichlorbenzene, the carboxylic acid chloride having the constitution:—

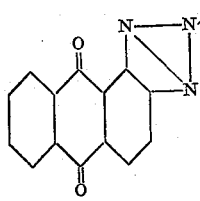

is obtained in the form of beautiful yellow needles.

A mixture of 26 parts of this acid chloride, 750 parts of nitrobenzene, 11 parts of 1-aminoanthraquinone and 10 parts of pyridine is heated at 130° C. for half an hour while stirring. A dyestuff is thus obtained in the form of red-yellow crystals which dyes cotton reddish yellow shades from a violet-blue vat.

By employing other vattable amino compounds instead of 1-aminoanthraquinone vat dyestuffs having very good fastness properties are obtained as set forth in the following table:

| Vattable amino compound | Coloration of the vat | Shade of color on cotton |
|---|---|---|
| 1.4-diaminoanthraquinone | Blue | Brown. |
| 1-amino-5-benzoylamino-anthraquinone. | Blue-green | Yellow. |
| 1-amino-4-benzoylamino-anthraquinone. | ---do--- | Red-brown. |
| 4-amino-1.9-anthrapyrimidine | Violet-blue | Yellow. |
| 5-amino-1.9-anthrapyrimidine | Blue | Do. |
| 1.2-(4'-aminophenyl)-triazoloanthraquinone (see Example 3). | Blue-violet | Do. |

Example 11

8 parts of sodium nitrite are dissolved in a little amount of water and the solution is added to a mixture of 12.7 parts of 1-amino-4-chlorbenzene, 30 parts of concentrated hydrochloric acid and 50 parts of water. The diazo solution is then mixed while stirring with a mixture of 19.5 parts of 2-aminoanthracene, 200 parts of pyridine and 400 parts of water. The resulting red precipitate is then filtered off by suction, washed and oxidized with chromium trioxide. The compound forms yellow needles and has the composition:—

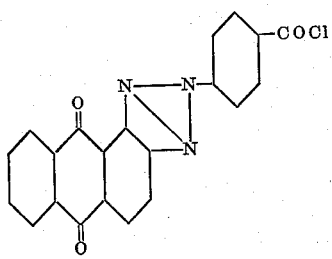

A mixture of 3.6 parts thereof, 3.4 parts of 1-amino-4-benzoylaminoanthraquinone, 1 part of anhydrous sodium acetate, 0.1 part of copper acetate and 100 parts of nitrobenzene is boiled for 6 hours, then cooled, the resulting dyestuff filtered off by suction, washed with methanol and water and dried. It is a violet-grey crystal powder, dyes vegetable fibres from a red violet vat grey shades.

By employing 1-amino-5-benzoylamino a vat dyestuff giving red-brown dyeings is obtained.

Example 12

A mixture of 3.6 parts of the para-chlorphenyl-triazoloanthraquinone described in the first paragraph of Example 11, 2.5 parts of 5-amino-1.9-anthrapyrimidine, 1 part of anhydrous sodium acetate, 0.1 part of copper acetate and 75 parts of nitrobenzene is heated to boiling for about 6 hours. After cooling and working up in the usual manner, the dyestuff formed is isolated. It is a brown powder and dyes vegetable fibres powerful currant shades from a red vat.

In a similar manner, the para-chlorphenyl-triazoloanthraquinone may be reacted with other amino derivatives of vattable compounds, valuable vat dyestuffs being obtained as set forth by the following table which serves to illustrate by way of example the properties of such dyestuffs.

| Vattable amino compound | Coloration of the vat | Shade of color on cotton |
|---|---|---|
| 1-aminoanthraquinone | Red | Bordeaux. |
| 1.4-diaminoanthraquinone | Red-violet | Grey. |
| 1.5-diaminoanthraquinone | ---do--- | Bordeaux. |
| 1-amino-4-methoxyanthraquinone. | Red | Violet. |
| 2-amino-1.9-anthrapyrimidine. | Red-violet | Red. |
| 4-amino-1.9-anthrapyrimidine. | Red | Brown. |
| 2-amino-3.4-phthaloyl-5.7-dichloracridone. | Red-violet | Green. |
| 1-aminoanthraquinone-2-aldehyde. | ---do--- | Yellow-brown. |
| 5-amino-N-methylanthrapyridone. | Violet | Violet-grey. |
| Aminodibenzpyrenequinone | Red-violet | Brownish grey. |

What I claim is:—

1. Vat dyestuffs of the triazoloanthraquinone series corresponding to the general formula

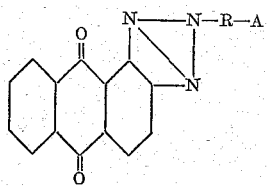

wherein R stands for a cyclic radical having up to two isocyclic non-hydrogenated rings and A for a radical of a compound capable of being reduced to a leuco compound combined with R by a single bridge selected from the class consisting of —CO—, —NH—, —CO.NH—, —NH.CO—, —CH₂— and —NH.CO.NH—.

2. Vat dyestuffs of the triazoloanthraquinone series corresponding to the general formula

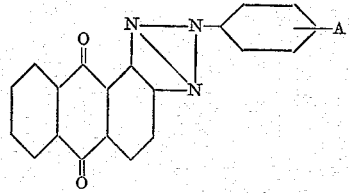

wherein A stands for a radical of a compound capable of being reduced to a leuco compound combined with the phenyl nucleus shown by a single bridge selected from the class consisting of —CO—, —NH—, —CO.NH—, —NH.CO—, —CH₂— and —NH.CO.NH.

3. Vat dyestuffs of the triazoloanthraquinone series corresponding to the general formula

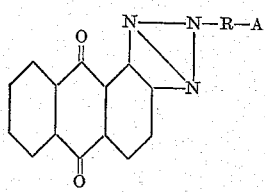

wherein R stands for a cyclic radical having up to two isocyclic non-hydrogenated rings and A for the radical of a para-quinoidic compound capable of being reduced to a leuco compound combined with R by a single bridge selected from the class consisting of —CO—, —NH—, —CO.NH—, —NH.CO—, —CH₂— and

—CH.CO.NH—.

4. Vat dyestuffs of the triazoloanthraquinone series corresponding to the general formula

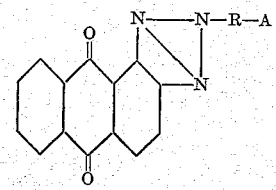

wherein R stands for a cyclic radical having up to two isocyclic non-hydrogenated rings and A for the radical of a vattable non-hydrogenated ring and A for the radical of a phthaloyl compound capable of being reduced to a leuco compound combined with R by a single bridge selected from the class consisting of —CO—, —NH—, —CO.NH—, —NH.CO—, —CH₂— and —NH.CO.NH—.

5. Vat dyestuffs of the triazoloanthraquinone series corresponding to the general formula

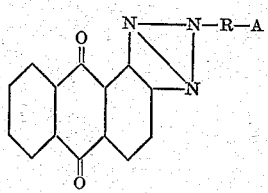

wherein R stands for a cyclic radical having up to two isocyclic non-hydrogenated rings and A for the radical of an anthraquinonic body combined with R by a bridge selected from the class consisting of —CO—, —NH—, —CO.NH—, —NH.CO—, —CH₂— and —NH.CO.NH—.

6. Vat dyestuffs of the triazoloanthraquinone series corresponding to the general formula

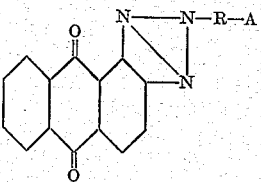

wherein R stands for a cyclic radical having up to two isocyclic non-hydrogenated rings and A for the radical of a phthaloylacridone combined with R by a bridge selected from the class consisting of —CO—, —NH—, —CO.NH—, —NH.CO—, —CH₂— and —NH.CO.NH—.

7. Vat dyestuffs of the triazoloanthraquinone series corresponding to the general formula

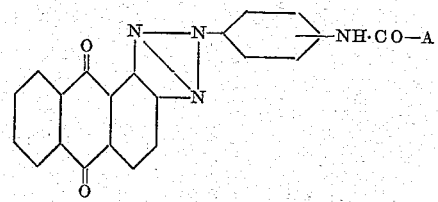

wherein A stands for a radical capable of being vatted.

8. Vat dyestuffs of the triazoloanthraquinone series corresponding to the general formula

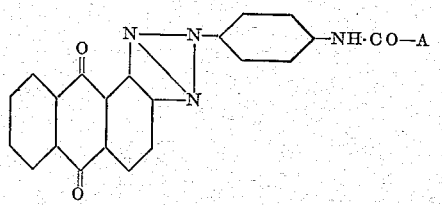

wherein A stands for a radical capable of being vatted.

9. The vat dyestuff of the triazoloanthraquinone series of the formula

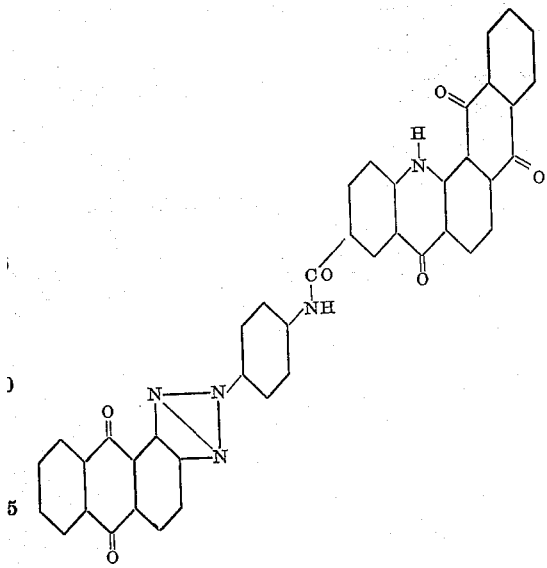

10. Vat dyestuffs of the triazoloanthraquinone series corresponding to the general formula

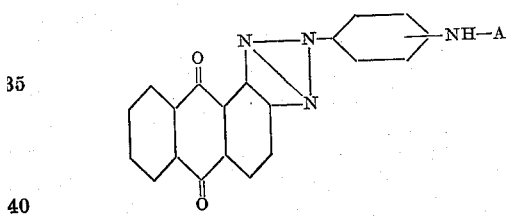

wherein A stands for a radical capable of being vatted.

11. Vat dyestuffs of the triazoloanthraquinone series corresponding to the general formula

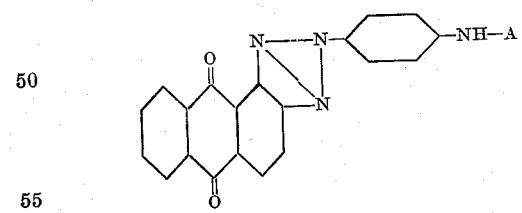

wherein A stands for a radical capable of being vatted.

12. Vat dyestuffs of the triazoloanthraquinone series corresponding to the general formula

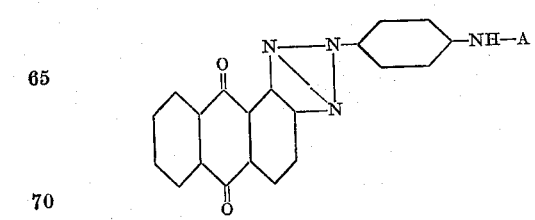

wherein A stands for the radical of a para-quinoidic compound capable of being vatted.

13. Vat dyestuffs of the triazoloanthraquinone series corresponding to the general formula

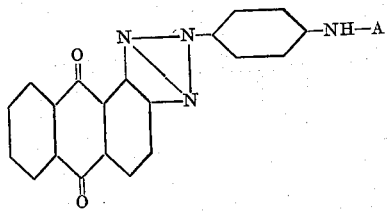

wherein A stands for the radical of an anthraquinone.

14. Vat dyestuffs of the triazoloanthraquinone series corresponding to the general formula

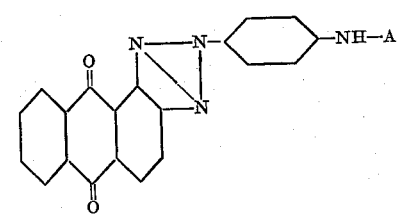

wherein A stands for the radical of an acylaminoanthraquinone.

15. The vat dyestuff of the triazoloanthraquinone series of the formula

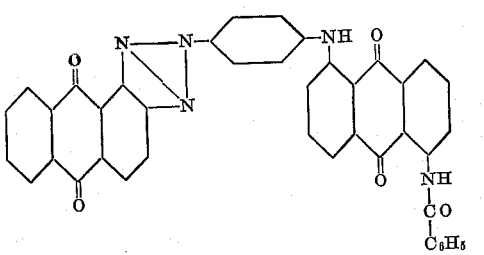

16. Vat dyestuffs of the triazoloanthraquinone series corresponding to the general formula

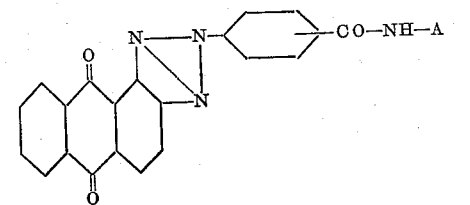

wherein A stands for the radical of a para-quinoidic compound capable of being vatted.

17. Vat dyestuffs of the triazoloanthraquinone series corresponding to the general formula

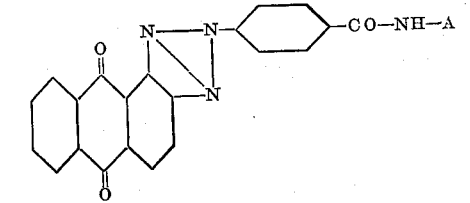

wherein A stands for the radical of a para-quinoidic compound capable of being vatted.

18. Vat dyestuffs of the triazoloanthraquinone series corresponding to the general formula
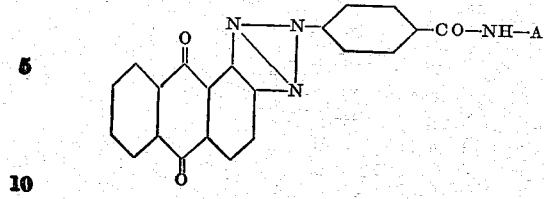
wherein A stands for the radical of an anthrapyrimidine.
19. The vat dyestuff of the triazoloanthraquinone series of the formula
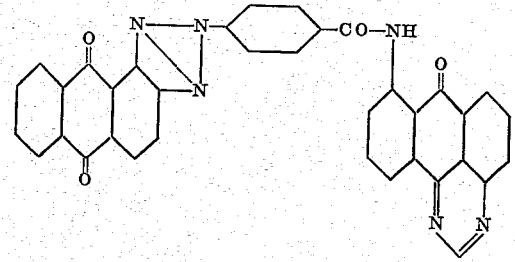
FRIEDRICH EBEL.